US009596405B2

(12) United States Patent
Huang et al.

(10) Patent No.: US 9,596,405 B2
(45) Date of Patent: Mar. 14, 2017

(54) IMAGE ACQUIRING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Shizhu Huang, Shenzhen (CN); Na Shao, Shenzhen (CN); Wenjun Gao, Shenzhen (CN); Ming Zhao, Shenzhen (CN); Fei Cheng, Shenzhen (CN); Qiao Ren, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/731,343

(22) Filed: Jun. 4, 2015

(65) Prior Publication Data
US 2015/0271389 A1 Sep. 24, 2015

Related U.S. Application Data

(63) Continuation of application No. PCT/CN2013/084157, filed on Sep. 25, 2013.

(30) Foreign Application Priority Data

Dec. 4, 2012 (CN) .......................... 2012 1 0512940

(51) Int. Cl.
H04N 5/232 (2006.01)
(52) U.S. Cl.
CPC ..... *H04N 5/23216* (2013.01); *H04N 5/23245* (2013.01); *H04N 5/23293* (2013.01); *G05B 2219/36168* (2013.01)

(58) Field of Classification Search
None
See application file for complete search history.

(56) References Cited

U.S. PATENT DOCUMENTS

2002/0063783 A1* 5/2002 Kurase .................. H04N 5/772
348/231.99
2006/0072028 A1* 4/2006 Hong ................. H04N 5/23216
348/333.01

(Continued)

FOREIGN PATENT DOCUMENTS

CN 1838736 A 9/2006
CN 101827211 A 9/2010

(Continued)

OTHER PUBLICATIONS

The World Intellectual Property Organization (WIPO) International Search Report for PCT/CN2013/084157 Nov. 28, 2013.

(Continued)

*Primary Examiner* — Mark T Monk
(74) *Attorney, Agent, or Firm* — Anova Law Group, PLLC

(57) ABSTRACT

The present disclosure discloses an image acquiring method and apparatus, and a storage medium. The method includes: receiving an operation instruction of a user; determining whether first duration corresponding to the operation instruction is equal to or greater than a first preparation time; if yes, displaying a timed notification, and determining whether second duration corresponding to the operation instruction is equal to or greater than second preparation time; and if yes, periodically acquiring a corresponding image at a preset time interval. The present disclosure simplifies a setting process of a continuous shooting operation.

17 Claims, 6 Drawing Sheets

(56) References Cited

U.S. PATENT DOCUMENTS

| | | | |
|---|---|---|---|
| 2011/0035665 A1* | 2/2011 | Kim | G06F 3/04883 |
| | | | 715/702 |
| 2012/0162464 A1 | 6/2012 | Kim | |
| 2012/0218190 A1 | 8/2012 | Pechanec et al. | |

FOREIGN PATENT DOCUMENTS

| | | |
|---|---|---|
| CN | 102420942 A | 4/2012 |
| CN | 102546925 A | 7/2012 |
| CN | 102566920 A | 7/2012 |
| CN | 102662571 A | 9/2012 |

OTHER PUBLICATIONS

The State Intellectual Property Office of the People's Republic of China (SIPO) Office Action 1 for 201210512940.X Sep. 7, 2016 pp. 1-9.

* cited by examiner

IMAGE ACQUIRING METHOD AND APPARATUS, AND STORAGE MEDIUM

CROSS-REFERENCES TO RELATED APPLICATIONS

This application is a continuation of PCT Application No. PCT/CN2013/084157, filed on Sep. 25, 2013, which claims priority to Chinese Patent Application No. CN201210512940X, filed on Dec. 4, 2012, the entire contents of all of which are incorporated herein by reference.

FIELD OF THE TECHNOLOGY

The present disclosure generally relates to the field of image technologies and, more particularly, relates to an image acquiring method and apparatus, and a storage medium.

BACKGROUND OF THE DISCLOSURE

Currently, most of digital photography products have functions such as automatic focusing and image continuous shooting. A photographing application of a digital photography product generally includes some photographing modes such as a continuous shooting mode, a stabilization mode, and a delay mode; and a default mode is a normal mode, and other modes need to be selected before photographing. A mobile phone is used as an example. Currently, a continuous shooting interaction manner used in a vertical continuous shooting application on a touchscreen mobile phone is similar to a continuous shooting manner of a single-lens reflex camera: if a photo button is short pressed, one photo is taken; and if the photo button is long pressed, photos are continuously taken until a finger moves up.

FIG. 1 is a schematic diagram of a fast burst camera in the existing technology. The fast burst camera includes a viewing area 11 and a photo button 12. When the photo button 12 is pressed, one photo is taken; and if the photo button 12 is long pressed, images within the viewing area 11 are continuously shot.

However, the existing technology has the following defects: a default photographing mode is the normal mode, and the continuous shooting mode needs to be selected before photographing; as a result, a setting process of a continuous shooting operation is needed and often cumbersome. Many times, a user may carelessly touch the photo button, continuous shooting starts until a finger moves up; therefore, it is difficult to correct, in time, such misoperation caused, and a cost caused by subsequent photo deletion is high. Moreover, for a digital photography product of a large size, a user cannot find a photo button accurately to complete a continuous shooting operation.

As such, in the existing technology, a setting process of a continuous shooting operation is cumbersome, a photographing manner of pressing a photo button to perform a continuous shooting operation is inconvenient, and it is difficult to correct misoperation in time.

Therefore, there is a need to solve technical problems in the image technologies and computer technologies to provide desired image acquiring method and apparatus, and a storage medium.

SUMMARY

An objective of the present disclosure is to provide an image acquiring method and apparatus, and a computer readable storage medium, which can simplify a setting process of an image continuous shooting operation during shooting through a touchscreen, and can correct a mistake in time when misoperation occurs and improve operation accuracy, thereby providing a faster image continuous shooting manner, and expanding an application range of image continuous shooting.

To achieve the foregoing objective, the technical solutions of the present disclosure are described as follows.

One aspect or embodiment of the present disclosure provides an image acquiring method by receiving an operation instruction of a user in an area on an image acquiring interface screen, the operation instruction corresponding to a touch action of the user on the same area. It is determined, according to the operation instruction, whether a first duration of the touch action on the mage acquiring interface screen is equal to or greater than a preset first preparation time. If the first duration is equal to or greater than the first preparation time, a timed notification is displayed. It is determined whether a second duration of the touch action on the mage acquiring interface screen is equal to or greater than a preset second preparation time. A corresponding image is periodically acquired at a preset time interval if the second duration is equal to or greater than the second preparation time Another aspect or embodiment of the present disclosure provides a non-transitory computer readable storage medium, including a computer readable program stored thereon. When being executed, the computer readable program causes a computing device to implement an image acquiring method by receiving an operation instruction of a user in an area on an image acquiring interface screen, the operation instruction corresponding to a touch action of the user on the same area. It is determined, according to the operation instruction, whether a first duration of the touch action on the mage acquiring interface screen is equal to or greater than a preset first preparation time. If the first duration is equal to or greater than the first preparation time, a timed notification is displayed. It is determined whether a second duration of the touch action on the mage acquiring interface screen is equal to or greater than a preset second preparation time. A corresponding image is periodically acquired at a preset time interval if the second duration is equal to or greater than the second preparation time.

Another aspect or embodiment of the present disclosure provides an image acquiring apparatus. The image acquiring apparatus includes a receiving unit, configured to receive an operation instruction of a user in an area on an image acquiring interface screen, the operation instruction corresponding to a touch action of the user on the same area; a first determining unit, configured to determine, according to the operation instruction, whether a first duration of the touch action on the mage acquiring interface screen is equal to or greater than a preset first preparation time; a second determining unit, configured to: when the first duration is equal to or greater than the first preparation time, determine whether a second duration of the touch action on the mage acquiring interface screen is equal to or greater than a preset second preparation time; an image acquiring unit, configured to periodically acquire a corresponding image at a preset time interval when the second duration is equal to or greater than the second preparation time; and a display unit, configured to display a timed notification when the first duration is equal to or greater than the first preparation time.

Compared with the existing technology, in the present disclosure, a photographing process can be started by clicking and pressing a touchscreen in any area (including a portion of the viewed image for an object to be photographed) within a viewfinder frame, and a continuous shooting operation can be implemented by long pressing the area without setting a photographing mode, thereby simplifying a setting process of the continuous shooting operation, and providing a faster continuous shooting operation manner. View finding can be more stable by long pressing a viewing area for continuous shooting, which more facilitates users with small hands, especially female users, and the continuous shooting operation can be implemented with a single hand, which considers convenience, fastness, and stability simultaneously, thereby expanding an application range of photographing through a touchscreen. By setting and determining a preparation time and displaying a timed notification, the current continuous shooting operation is completed under the precondition that the user determines the current continuous shooting operation, thereby effectively avoiding misoperation, improving accuracy of the continuous shooting operation, and effectively reducing a cost caused by subsequent photo deletion.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure. The embodiments of the present invention are described below with reference to the accompanying drawings. In these accompanying drawings.

DESCRIPTION OF EMBODIMENTS

Figure 1:
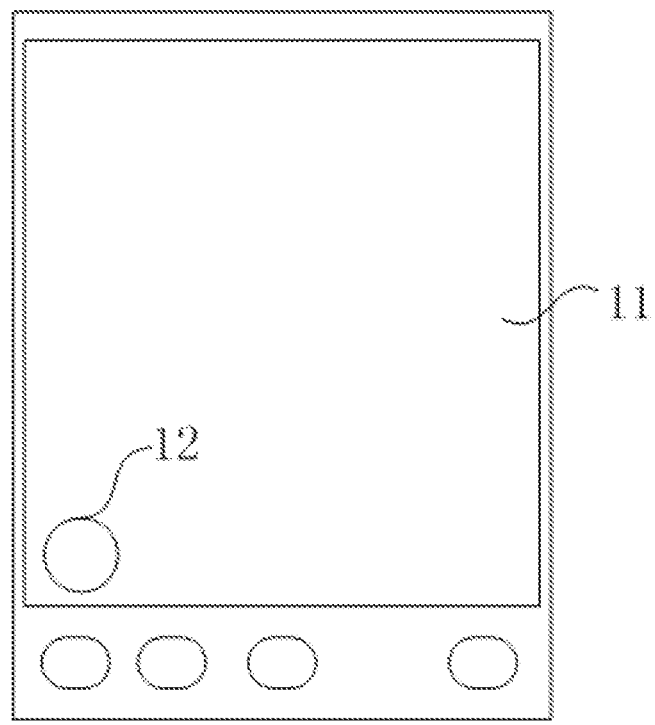
FIG. 1 is a schematic diagram of a fast burst camera in the existing technology.

Reference will now be made in detail to exemplary embodiments of the disclosure, which are illustrated in the accompanying drawings. Wherever possible, the same reference numbers will be used throughout the drawings to refer to the same or like parts. An image acquiring method and apparatus provided by the present disclosure are described in detail below with reference to the accompanying drawings.

The image acquiring method and apparatus in the embodiments of the present invention are applicable to a computing device including, but not limited to, a personal computer, a server computer, a handheld or laptop device, a mobile device (for example, a mobile phone, a personal digital assistant (PDA), or a media player), a multi-processor system, a consumer electronic device, a small computer, a mainframe computer, a distributed computing environment including any one of the foregoing systems or devices, and the like.

The subject required to be protected in the present disclosure may be implemented by using standard programming and/or an engineering technology to produce software, firmware, hardware, or any other combination thereof, to control a computer to implement a method, an apparatus, or an article of manufacture of the disclosed subject. The term "article of manufacture" used in the specification is intended to encompass a computer program accessible from any computer-readable device, carrier, or medium. Certainly, a person skilled in the art may be aware that modifications may be performed on the configuration without departing from the scope and spirit of the subject required to be protected.

The word "embodiment" used in the specification refers to an instance, an example, or an illustration. Any aspect or design described as an "embodiment" in this specification shall not necessarily be interpreted as being preferred over other aspects or designs. On the contrary, the word "embodiment" is used to propose a concept in a specific manner. The term "or" used in this specification aims to mean an inclusive "or", but not an exclusive "or". That is, unless specified otherwise or clear from the context, "X uses A or B" refers to any of natural inclusive permutations. That is, if X uses A, X uses B, or X uses both A and B, "X uses A or B" is satisfied in any one of the foregoing examples. Moreover, the article "a" used in the specification and claims may generally be explained as "one or more", unless otherwise specified or clearly directed to a singular form according to the context.

The terms "component", "module", "system", "interface" and the like generally refer to: hardware, combinations of hardware and software, software or executing software. For example, a component may be, but is not limited to, a process running in a processor, a processor, an object, an executable application, an executed thread, a program and/or a computer. According to the drawings, both an application running on a controller and the controller may be components. One or more components may exist in an executed process and/or thread, and the component may be located on one computer and/or distributed between two or more computers.

Figure 2:
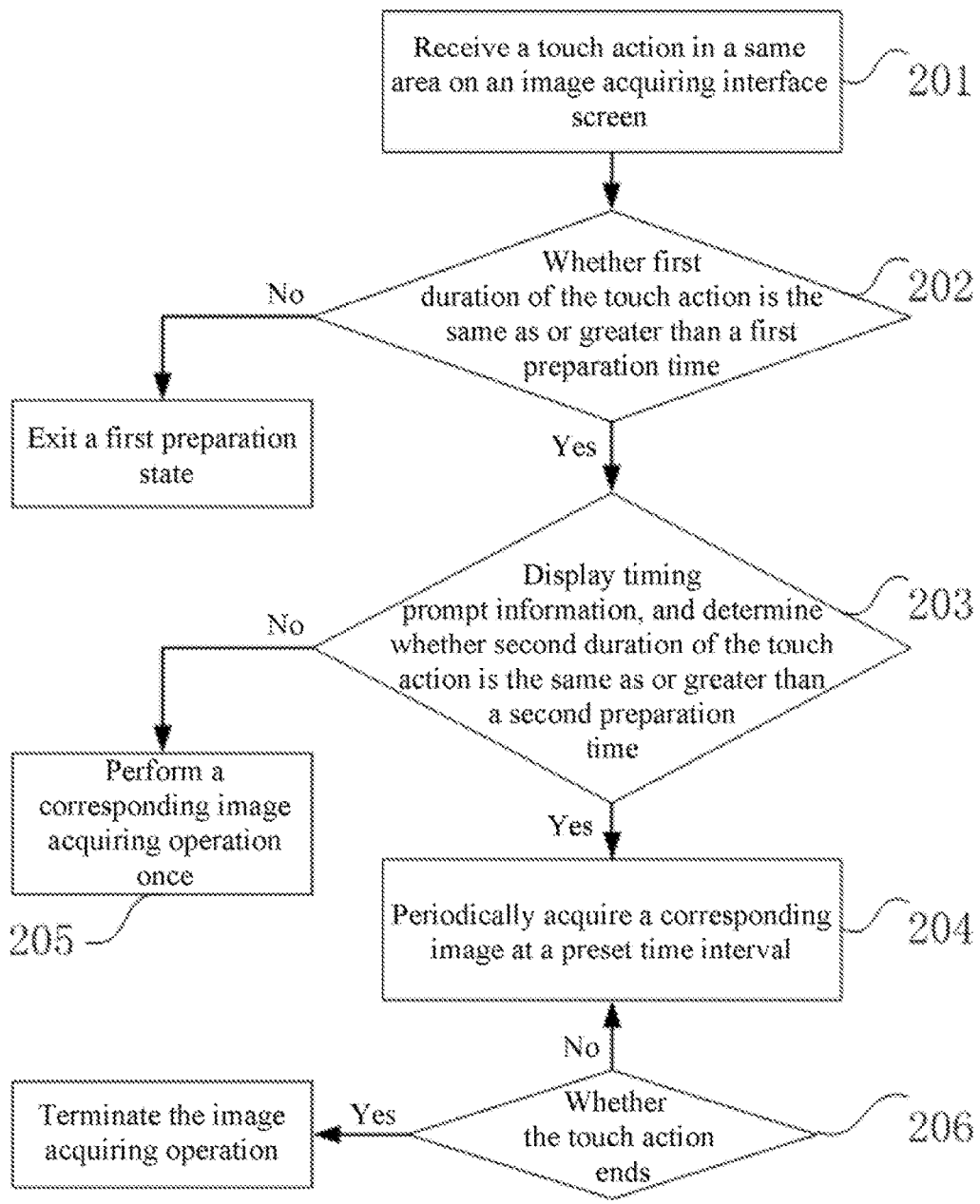
FIG. 2 is a flowchart of a preferred exemplary implementation manner of an image acquiring method according to the present disclosure.
Figure 3:
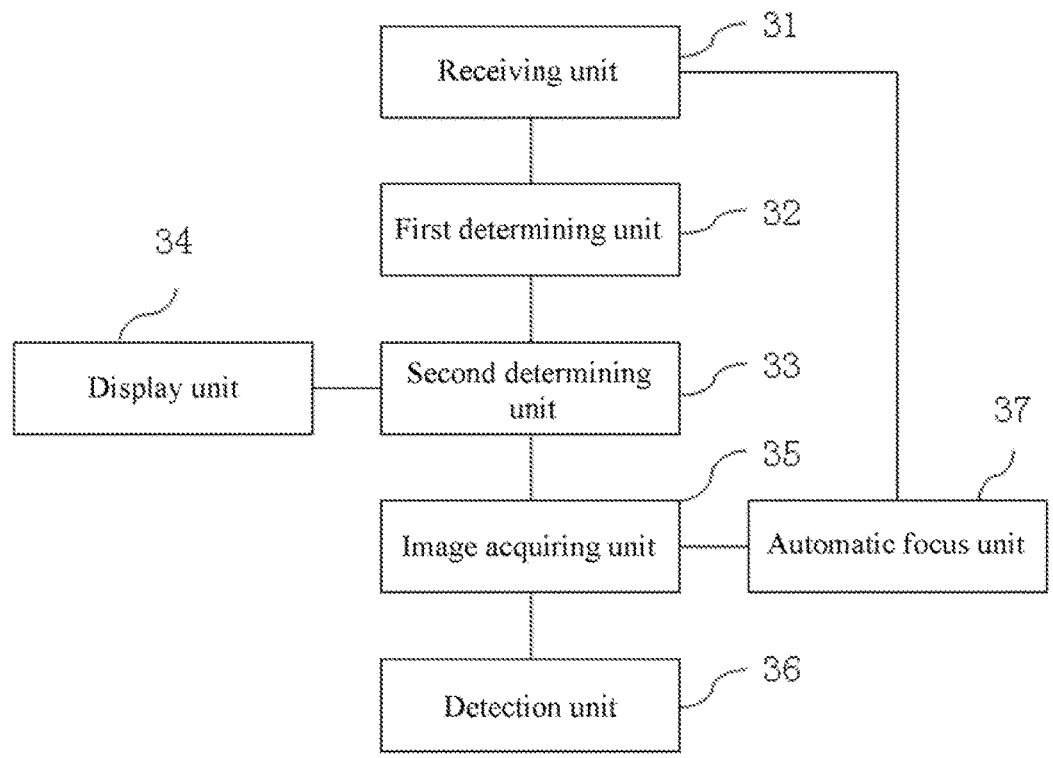
FIG. 3 is an architectural diagram of a preferred exemplary implementation manner of an image acquiring apparatus according to the present disclosure.

FIG. 2 shows a flowchart of the image acquiring method in a preferred exemplary implementation manner, and FIG. 3 is an architectural diagram of a preferred exemplary implementation manner of an image acquiring apparatus according to the present disclosure.

The image acquiring apparatus in this embodiment of the present invention includes a receiving unit 31, a first determining unit 32, a second determining unit 33, a display unit 34, and an image acquiring unit 35.

In step 201, the receiving unit 31 receives a touch action in an area on an image acquiring interface screen, that is, the receiving unit 31 receives an operation instruction of a user in the same area on the image acquiring interface screen, the operation instruction corresponding to the touch action of the user.

Specifically, after an image function is enabled and an image acquiring interface is entered, the receiving unit 31 can receive a touch action in any part on the image acquiring interface screen to enter a procedure of shooting through a touchscreen. After a touch action is received in the same area, a continuous shooting operation can be directly determined without starting a photographing mode setting application to set a continuous shooting mode.

That it is inconvenient to perform a continuous shooting operation by pressing a photo button in the existing technology mainly because for a continuous shooting mode, the continuous shooting mode needs to be set in a photographing mode setting application. In addition, a photo button of an existing digital photography product is located in an excessively lower part, which is unsuitable for operating, with one hand, a digital photography product with a large touchscreen (for example, a mobile phone of 4 to 5.3 inches). A click operation on the photo button at the lower part does not conform to the ergonomics design, and a curvature of the thumb is large, which is adverse to hold the digital photography product stably.

By using the technical solutions provided by the present disclosure, after an image function is enabled on a digital photography product or any suitable devices and an image acquiring interface is entered, any part of a viewing area on a screen can receive a touch action to enter a procedure of shooting through a touchscreen. When a touch action is received in an area on the screen, a continuous shooting operation can be directly determined without starting a photographing mode setting application to set a continuous shooting mode, which simplifies a setting process of the continuous shooting operation.

In step 202, the first determining unit 32 determines, according to the operation instruction, whether first duration of the touch action is equal to (the same as) or greater than a preset first preparation time; and if the first duration is the same as or greater than the first preparation time, step 203 is performed, where the first preparation time may be set to be within a range from 0.1 s (second) to 0.3 s according to an actual requirement, and is preferably 0.2 s.

After the touch action is received in the same area on the screen, a first preparation state is entered, where the first preparation state has a preset first preparation time. The first preparation time may be preset according to an actual shooting requirement, so that after the touch action is received in the same area on the screen, a timing operation is performed for the first preparation state according to the first preparation time, where a result obtained through timing is the first duration, so as to determine that the current touch action is a shooting operation, thereby avoiding misoperation. When the result obtained through timing, that is, the first duration, is less than the first preparation time, that is, the touch action in the same area is suspended within the first preparation time, the first preparation state is exited, and it is further determined whether a touch action (for example, a sliding operation or any type of touching operation) occurs in a different area; and if a touch action occurs in a different area, a corresponding operation is performed according to the touch action in the different area. If the first duration is the same as or greater than the first preparation time, step 203 is performed.

For an existing digital photography product having a continuous shooting function, if a user carelessly touches a photo button in a continuous shooting mode, continuous shooting starts until a finger moves up. Because a waiting time for determining is not set before continuous shooting, it is difficult to correct a mistake in time after misoperation occurs. In the present disclosure, by setting the preparation time, a mistake can be corrected in time when misoperation occurs, which improves operation accuracy. That is, the user may cancel proceeding of a continuous shooting procedure by means of a sliding operation or a moving up operation at any time within the first preparation time, thereby effectively avoiding misoperation, improving accuracy of a continuous shooting operation, and effectively reducing a cost caused by subsequent photo deletion.

In step 203, if the first duration is equal to or greater than the first preparation time, the display unit 34 displays a timed notification; and the second determining unit 33 determines whether second duration of the touch action is the same as or greater than a preset second preparation time; and step 204 is performed if the second duration is the same as or greater than the second preparation time; otherwise, step 205 is performed, where the second preparation time may be set to be within a range from 0.3 s to is according to an actual requirement, and is preferably 0.5 s.

The timed notification may be picture, text, voice, and/or animation information. The step of displaying, by the display unit 34, timed notification includes: playing, by the display unit 34, an animation having a playing duration equal to the second duration. For example, that a circular ring rotates clockwise at a constant speed and gradually a closed circular ring is formed is displayed, and a time from appearance of the circular ring to closing is equal to the second preparation time. If the second duration is the same as or greater than the second preparation time, a complete animation of rotating of the circular ring is played; otherwise, the second duration ends, and playback of the animation of rotating of the circular ring ends. In addition to rotating of the circular ring, the timed notification for long pressing may further be rotating of a pie or other timed notification for visual feedback that can represent a time progress. By playing a timed animation, the user may be informed that the continuous shooting procedure is currently already entered. If the user does not need to continuously shoot an image within a current viewing area, the user cancels touch control and pressing on the touchscreen, thereby terminating the current image acquiring operation, and effectively reducing misoperation.

After it is determined that the first duration is the same as or greater than the first preparation time, a second preparation state is entered, where the second preparation state has a preset second preparation time. The second preparation time is preset according to an actual shooting requirement, so that after it is determined that the first duration is the same as or greater than the first preparation time, the second determining unit 33 performs a timing operation for the second preparation state according to the second preparation time, where a result obtained through timing is the second duration, and the user is simultaneously prompted by displaying timed information, so as to further determine that the current touch action is a continuous shooting operation, thereby improving accuracy of the continuous shooting operation, and further avoiding misoperation. If the touch action in the same area is not suspended in the second preparation state, that is, the result obtained through timing for the second preparation state is the same as or greater than the second preparation time, step 204 is performed.

In step 204, the image acquiring unit 35 periodically acquires a corresponding image at a preset time interval if the second duration is equal to or greater than the second preparation time. The preset time interval is a preset time interval between shooting for two consecutive times, and the time interval may be set to be within a range from 0.1 s to 0.3 s according to an actual requirement. A corresponding image acquiring operation is periodically performed at the preset time interval, so as to implement the continuous shooting operation.

In step 205, the image acquiring unit 35 performs a corresponding image acquiring operation when the second duration is less than the second preparation time. In another implementation manner, if the second duration is less than the second preparation time, it may be selected to exit the second preparation state, and step 201 is performed to start to wait again to receive a touch action in the same area on the image acquiring interface screen; or it is determined whether a touch action (for example, a sliding operation) occurs in a different area, and a corresponding operation is performed.

In another implementation manner, the image acquiring apparatus may further include a detection unit 36, and step 206 may be further performed after step 204.

In step 206, the detection unit 36 detects whether the touch action ends; and if yes, the image acquiring unit 35 terminates the image acquiring operation (e.g., including the a touch action); otherwise, step 204 is continued to be performed, that is, the image acquiring unit 35 continues to periodically acquire a corresponding image at the preset time interval.

During image continuous shooting, the image acquiring apparatus presets image continuous shooting, if a time interval between shooting for two consecutive times is 150 ms, performs an image acquiring operation when every 150 ms (milliseconds) after the second preparation state ends, and does not end the continuous shooting operation until the touch action ends. For example, if the touch action lasts for 140 ms after the second preparation state ends, the current continuous shooting operation is performed when in total and one image is acquired; and if the second duration is 1500 ms, the current continuous shooting operation is performed 11 times in total and 11 images are acquired.

By using the foregoing method, a user can start a photographing procedure by clicking and pressing a touchscreen in any area within a viewfinder frame, and can implement a continuous shooting operation by long pressing the area without selecting and setting a continuous shooting mode of an image acquiring apparatus, thereby simplifying a setting process of a continuous shooting operation, providing a faster continuous shooting operation manner, and expanding an application range of continuous shooting. By setting and determining a preparation time and displaying timed information, the current continuous shooting operation is completed under the precondition that the user determines the current continuous shooting operation, thereby effectively avoiding misoperation, improving accuracy of the continuous shooting operation, and effectively reducing a cost caused by subsequent photo deletion.

In another implementation manner, the image acquiring apparatus may further include an automatic focusing unit (or an automatic focusing module) 37. After the touch action is received in the same area on the screen and before it is determined whether the second duration is the same as or greater than the second preparation time, the method further includes a step of acquiring, by the automatic focusing unit 37, location coordinates corresponding to the touch action; and setting a focal point of an image acquiring operation to be located at the location coordinates, thereby implementing a function of local focal pointing in any screen location within the viewing area.

A preferred exemplary implementation manner of the image acquiring apparatus in the present disclosure is provided next with reference to the accompanying drawings.

FIG. 3 is an architectural diagram of the image acquiring apparatus according to the preferred exemplary implementation manner.

The receiving unit 31 is configured to receive a touch action in an area on an image acquiring interface screen, that is, the receiving unit 31 is configured to receive an operation instruction of a user in the same area of the image acquiring interface screen, the operation instruction corresponding to the touch action of the user. After an image function is enabled and an image acquiring interface is entered, the receiving unit 31 receives an operation instruction corresponding to a touch action in any part on the image acquiring interface screen to enter a procedure of shooting through a touchscreen. After the receiving unit 31 receives a touch action in the same area, a continuous shooting operation can be directly determined without starting a photographing mode setting application to set a continuous shooting mode, thereby simplifying a setting process of the continuous shooting operation.

The first determining unit 32 is configured to determine, according to the operation instruction, whether first duration of the touch action is equal to (the same as) or greater than a preset first preparation time; and if the first duration is the same as or greater than the first preparation time, the second determining unit 33 is operated, where the first preparation time may be set to be within a range from 0.1 s to 0.3 s according to an actual requirement, and is preferably 0.2 s.

After the receiving unit 31 receives the touch action in the same area on the screen, a first preparation state is entered, where the first preparation state has a preset first preparation time. The first preparation time may be preset according to an actual shooting requirement, so that after the touch action is received in the same area on the screen, a timing operation is performed for the first preparation state according to the first preparation time, where a result obtained through timing is the first duration, so as to determine that the current touch action is a shooting operation, thereby avoiding misoperation.

When the result obtained through timing, that is, the first duration, is less than the first preparation time, that is, the touch action in the same area is suspended within the first preparation time, the first preparation state is exited, and it is further determined whether a touch action (for example, a sliding operation) occurs in a different area; and if a touch action occurs in a different area, a corresponding operation is performed according to the touch action in the different area. If the first duration is the same as or greater than the first preparation time, the second determining unit 33 is executed.

If the first duration is the same as or greater than the first preparation time, the second determining unit 33 is configured to determine whether second duration of the touch action is the same as or greater than a preset second preparation time; and if the second duration is the same as or greater than the second preparation time, the image acquiring unit 35 periodically acquires a corresponding image at a preset time interval, where the second preparation time may be set to be within a range from 0.3 s to is according to an actual requirement, and is preferably 0.5 s.

The display unit 34 is configured to display a timed notification while the second determining unit 33 performs the step of determining, that is, the display unit 34 is configured to display the timed notification when the first duration is equal to or greater than the first preparation time. The displaying, by the display unit 34, timed notification includes: playing an animation having a playing duration equal to the second duration. For example, that a circular ring rotates clockwise at a constant speed and gradually a closed circular ring is formed is displayed, and a time from appearance of the circular ring to closing is equal to the second preparation time. If the second duration is the same as or greater than the second preparation time, a complete animation of rotating of the circular ring is played; otherwise, the second duration ends, and playback of the animation of rotating of the circular ring ends.

In addition to rotating of the circular ring, the timed notification for the long pressing may further be rotating of a pie or other timed notification for visual feedback that can represent a time progress. By playing a timed animation, the user may be informed that the continuous shooting procedure is currently already entered. If the user does not need to continuously shoot an image within a current viewing area, the user may cancel touch control and pressing on the touchscreen, thereby terminating the current image acquiring operation, and effectively reducing misoperation.

After it is determined that the first duration is the same as or greater than the first preparation time and before a corresponding image is acquired, a second preparation state is entered, where the second preparation state has a preset second preparation time. The second preparation time is preset according to an actual shooting requirement, so that after it is determined that the first duration is the same as or greater than the first preparation time, a timing operation is performed for the second preparation state according to the second preparation time, where a result obtained through timing is the second duration, the display unit 34 simultaneously prompts the user by displaying the timed information, so as to further determine that the current touch action is a continuous shooting operation, thereby further avoiding misoperation. If the touch action in the same area is not suspended in the second preparation state, that is, the result obtained through timing for the second preparation state is the same as or greater than the second preparation time, the image acquiring unit 35 is controlled to perform an image acquiring operation.

The image acquiring unit 35 is configured to acquire a corresponding image, for example, periodically acquire a corresponding image at a preset time interval if the second duration is equal to or greater than the second preparation time, so as to implement the continuous shooting operation. The preset time interval is a preset time interval between shooting for two consecutive times, and the time interval may be set to be within a range from 0.1 s to 0.3 s according to an actual requirement. The image acquiring unit 35 periodically performs a corresponding image acquiring operation at the preset time interval.

In another implementation manner, the image acquiring unit 35 is further configured to: if the second duration is less than the second preparation time, perform a corresponding image acquiring operation when to acquire one image.

In another implementation manner, the image acquiring apparatus further includes a detection unit 36, configured to detect whether the touch action ends; and if yes, the image acquiring unit 35 is further configured to terminate the image acquiring operation; otherwise, the image acquiring unit 35 is further configured to continue to periodically acquire a corresponding image at the preset time interval.

In another implementation manner, the image acquiring apparatus further includes an automatic focusing module (automatic focusing unit) 37. After the receiving unit 31 receives the touch action in the same area on the image acquiring interface screen, the automatic focusing unit 37 is configured to acquire location coordinates corresponding to the touch action, and set a focal point of an image acquiring operation to be located at the location coordinates, thereby implementing a function of local focal pointing in any screen location within the viewing area.

Preferred embodiments of the foregoing technical solutions are provided next with reference to the accompanying drawings.

Figure 4:
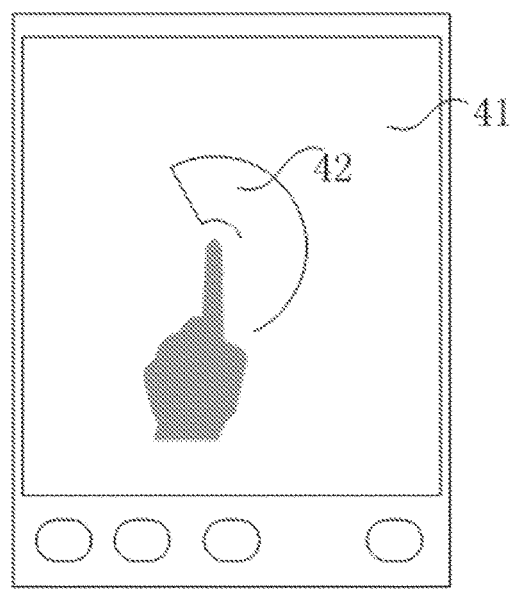
FIG. 4 is a schematic diagram of displaying a timed notification according to an embodiment of an image acquiring method of the present invention.
Figure 5:
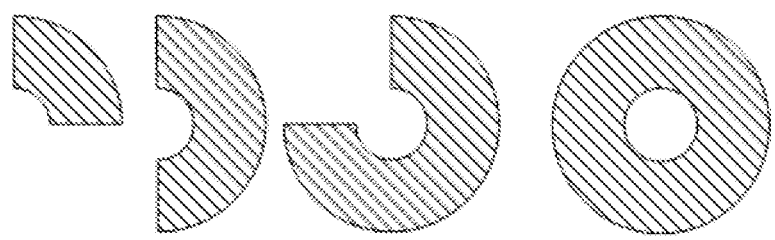
FIG. 5 is a schematic diagram of animation display of the timed notification in FIG. 4.
Figure 6:
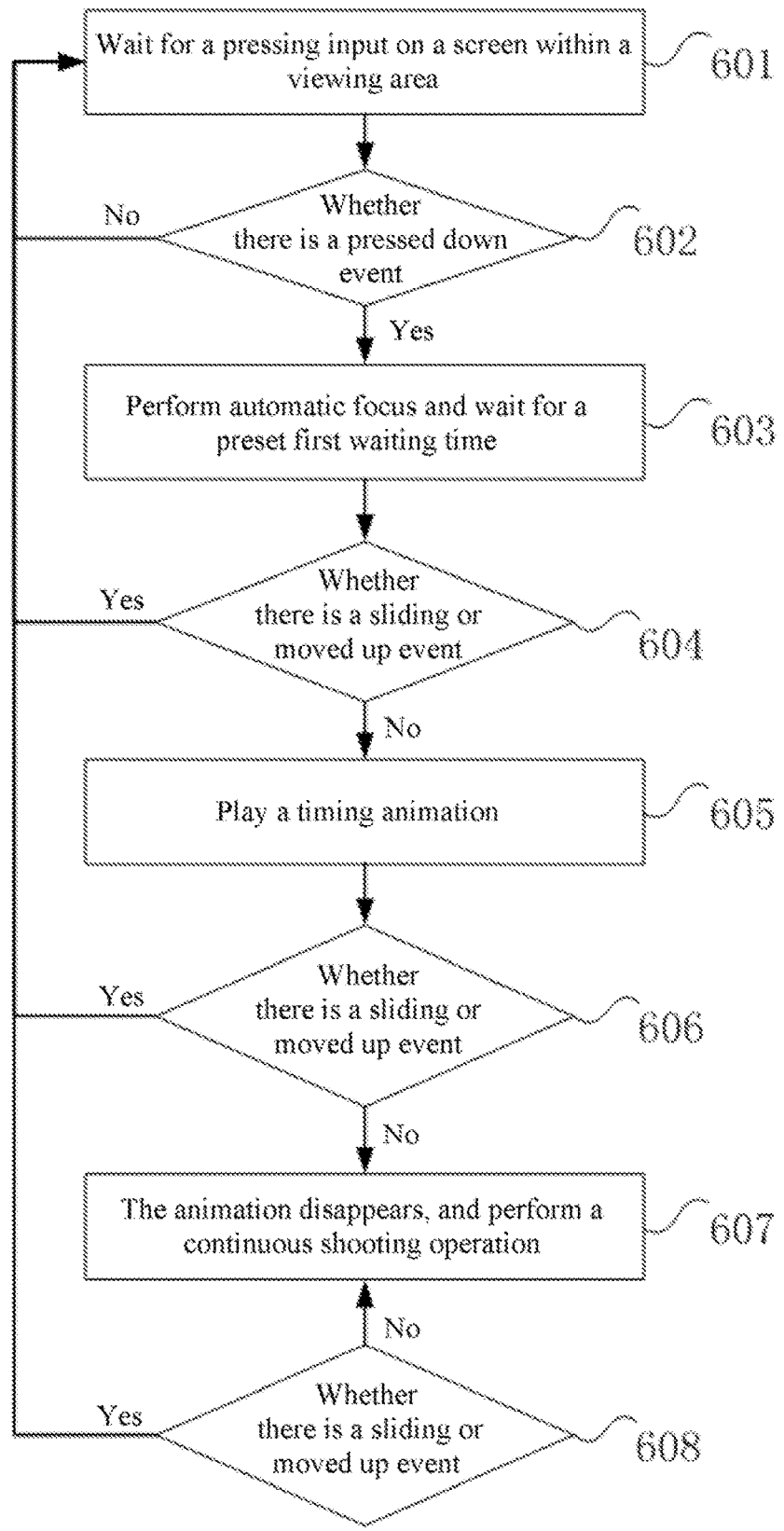
FIG. 6 is a flowchart of an image acquiring method according to an embodiment of an image acquiring method of the present disclosure.

Referring to FIG. 4, FIG. 5, and FIG. 6, FIG. 4 is a schematic diagram of displaying timed notification according to an embodiment of the present invention, FIG. 5 is a schematic diagram of animation display of the timed notification in FIG. 4, and FIG. 6 is a flowchart of an image acquiring method with continuous shooting control according to an embodiment of the present invention. In FIG. 4, after an image function is enabled and a photographing state is entered, a touchscreen in all areas within a viewing area 41 waits for a screen pressing event, and a continuous shooting operation can be entered by pressing the viewing area 41 without setting a photographing mode. After long pressing the viewing area 41, the display unit 34 displays timed notification in an animation playback area 42, for example, displays that a circular ring rotates clockwise at a constant speed and gradually a closed circular ring is formed, and a time from appearance of the circular ring to closing is equal to the second preparation time, as shown in FIG. 5. The circular ring disappears after rotating a cycle, and the image acquiring unit 35 simultaneously performs a continuous shooting operation. The user may release to cancel the current continuous shooting operation within a time of one cycle.

Referring to FIG. 6, in step 601, a pressing input on a screen within a viewing area is waited for; in step 602, it is determined whether a pressed down event is triggered; and if yes, step 603 is performed; otherwise, step 601 is performed; in step 603, when a pressed down event is triggered on the screen within the viewing area, the image acquiring unit 35 enters a state of photographing through a touchscreen, and the automatic focusing unit 37 performs automatic focusing on a pressed area and waits for a preset first waiting time (for example, 200 ms); in step 604, the first determining unit 32 determines whether a sliding or moved up event is triggered within the first waiting time; and if either of the events is triggered (if a sliding event is triggered, screen sliding logic is entered), the current continuous shooting operation is ended and step 601 is performed to continue to wait; or if neither of the two events occurs, step 605 is performed; in step 605, the display unit 34 plays an animation (for example, a partial circular ring that rotates clockwise at a constant speed from 0° (degree) appears on the screen); in step 606, the second determining unit 33 determines whether a moved up event is triggered during animation playback (for example, within second a preset second waiting time during which the circular ring rotates from 0° to 360°, where the second waiting time may be set to 500 ms); and if either of the events is triggered, the photographing state is exited, the image acquiring unit 35 ends the current continuous shooting operation, and step 601 is performed to continue to wait; or if neither of the two events occurs, step 607 is performed; in step 607, the animation disappears, and the image acquiring unit 35 performs a continuous shooting operation; and in step 608, it is determined whether a moved up event is triggered during photographing; and if either of the events is triggered, the photographing state is exited, the current continuous shooting operation is ended, and step 601 is performed to continue to wait; or if neither of the two events occurs, step 607 is continued to be performed.

According to the technical solutions provided by the present disclosure, a shooting procedure can be started by clicking and pressing a touchscreen in any area within a viewfinder frame, and a continuous shooting operation can be implemented by long pressing the area without setting a photographing mode, thereby simplifying a setting process of the continuous shooting operation, and providing a faster continuous shooting operation manner. View finding can be more stable by long pressing for photographing, which more facilitates users with small hands, especially female users, and the continuous shooting operation can be implemented with a single hand, which considers convenience, fastness, and stability simultaneously, thereby expanding an application range of photographing through a touchscreen. By setting and determining a preparation time and displaying timed notification, the current continuous shooting operation is completed under the precondition that the user determines the current continuous shooting operation, thereby effectively avoiding misoperation, improving accuracy of the continuous shooting operation, and effectively reducing a cost caused by subsequent photo deletion.

A computer readable storage medium in an embodiment of the present invention stores a computer program, and the computer program is used to perform the foregoing image acquiring method, that is, the computer program may be an instruction program executed by a computer and used for performing an image acquiring function, where the function includes all or some of the steps in the foregoing image acquiring method, for example, step 201 to step 206 and/or step 601 to step 608.

The computer readable medium includes a computer storage medium, the computer storage medium includes a volatile and non-volatile medium, and a removable medium and an irremovable medium that are used to store information such as a computer readable instruction or other data and implemented by using any method or technology. A memory is an instance of the computer storage medium. The computer storage medium includes, but is not limited to, a random access memory (RAM), a read-only memory (ROM), an electrically erasable programmable read-only memory (EEPROM), a flash memory or another memory, a compact disc ROM (CD-ROM), a digital versatile disc (DVD), another optical storage apparatus, a tape cartridge, a magnetic tape, a magnetic disk storage apparatus, or another magnetic storage device.

Figure 7:
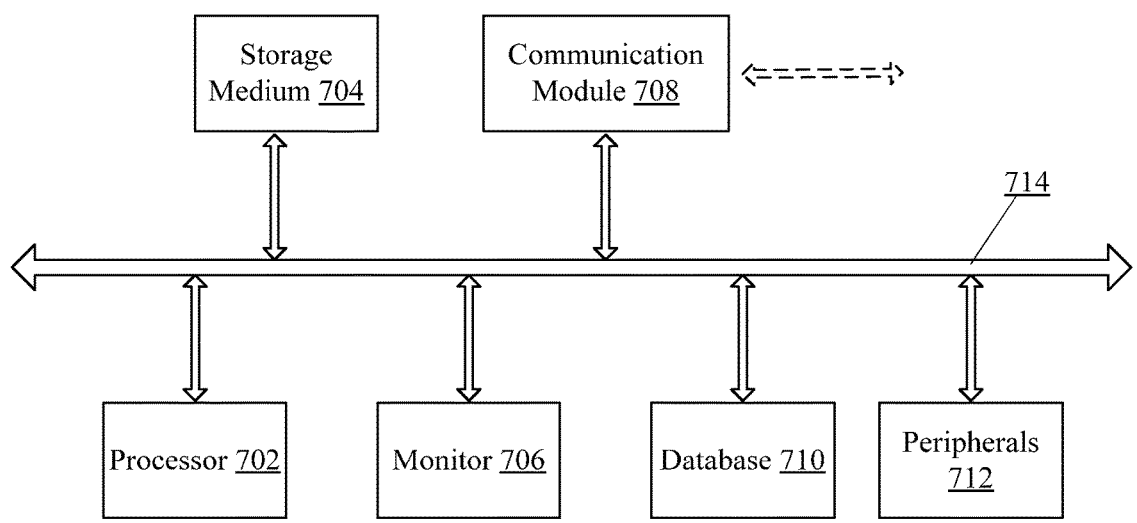
FIG. 7 illustrates an exemplary computing device consistent with the disclosed embodiments.

For example, FIG. 7 illustrates an exemplary computing device capable of implementing the disclosed methods, consistent with the disclosed embodiments. As shown in FIG. 7, the exemplary computing device 700 may include a processor 702, a storage medium 704, a monitor 706, a communication module 708, a database 710, peripherals 712, and one or more bus 714 to couple the devices together. Certain devices may be omitted and other devices may be included.

Processor 702 may include any appropriate processor or processors. Further, processor 702 may include multiple cores for multi-thread or parallel processing. The processor 702 may be used to run computer program(s) stored in the storage medium 704. Storage medium 704 may include memory modules, such as ROM, RAM, and flash memory modules, and mass storages, such as CD-ROM, U-disk, removable hard disk, etc. Storage medium 704 may store computer programs for implementing various disclosed processes, when executed by processor 702. In one embodiment, storage medium 704 may be a non-transient computer-readable storage medium having a computer program stored thereon, when being executed, to cause the computer to implement the disclosed methods.

Further, peripherals 712 may include I/O devices such as keyboard and mouse, and communication module 708 may include network devices for establishing connections, e.g., through a communication network such as the Internet. Database 710 may include one or more databases for storing certain data and for performing certain operations on the stored data, such as webpage browsing, database searching, etc.

The computer readable instruction may be implemented as a program module, for example, a function, an object, an application programming interface (API), or a data structure for executing a specific task or implementing a specific abstract data type. Typically, functions of the computer readable instruction may be randomly combined or distributed in various environments.

In conclusion, although preferred embodiments of the present invention are disclosed above, the preferred embodiments are not intended to limit the present disclosure, and a person of ordinary skill in the art may make various modifications and polishing without departing from the spirit and scope of the present disclosure; therefore, the protection scope of the present disclosure shall be subject to the scope specified by the claims.

What is claimed is:

1. An image acquiring method, comprising:
    receiving an operation instruction of a user in an area on an image acquiring interface screen, the operation instruction corresponding to a touch action of the user on the same area;
    determining, according to the operation instruction, whether a first duration of the touch action on the mage acquiring interface screen is equal to or greater than a preset first preparation time;
    if the first duration is equal to or greater than the first preparation time, displaying a timed notification, and determining whether a second duration of the touch action on the mage acquiring interface screen is equal to or greater than a preset second preparation time; and
    periodically acquiring a corresponding image at a preset time interval if the second duration is equal to or greater than the second preparation time;
    wherein the image acquiring method further comprises:
    performing a corresponding, single image acquiring operation when the second duration is less than the second preparation time.

2. The image acquiring method according to claim 1, wherein, after the step of receiving the operation instruction of the user in the area on an image acquiring interface screen, and before the step of determining whether the second duration of the touch action is equal to or greater than the preset second preparation time, the method further comprises:
    acquiring location coordinates corresponding to a touch point of the touch action; and
    setting a focal point of an image acquiring operation to be located at the location coordinates.

3. The image acquiring method according to claim 1, further comprising:
    detecting whether the touch action ends; and
    terminating an image acquiring operation if the touch action ends, and continuing to periodically acquire a corresponding image at the preset time interval if the touch action does not end.

4. The image acquiring method according to claim 1, wherein the step of displaying timed notification comprises:
    playing an animation having a playing duration equal to the second duration.

5. The image acquiring method according to claim 1, wherein the first preparation time is within a range from 0.1 s to 0.3 s, and the second preparation time is within a range from 0.3 s to 1 s.

6. The image acquiring method according to claim 1, wherein the time interval is within a range from 0.1 s to 0.3 s.

7. A non-transitory computer readable storage medium, comprising a computer readable program stored thereon, wherein, when being executed, the computer readable program causes a computing device to implement an image acquiring method, the method comprising:
 receiving an operation instruction of a user in an area on an image acquiring interface screen, the operation instruction corresponding to a touch action of the user on the same area;
 determining, according to the operation instruction, whether a first duration of the touch action on the mage acquiring interface screen is equal to or greater than a preset first preparation time;
 if the first duration is equal to or greater than the first preparation time, displaying a timed notification, and determining whether a second duration of the touch action on the mage acquiring interface screen is equal to or greater than a preset second preparation time; and
 periodically acquiring a corresponding image at a preset time interval if the second duration is equal to or greater than the second preparation time
 wherein the method further comprises:
 performing a corresponding, single image acquiring operation when the second duration is less than the second preparation time.

8. The non-transitory computer readable storage medium according to claim 7, wherein after the step of receiving the operation instruction of the user in the area on the image acquiring interface screen, and before the step of determining whether the second duration of the touch action is equal to or greater than the preset second preparation time, the method further comprises:
 acquiring location coordinates corresponding to a touch point of the touch action; and
 setting a focal point of an image acquiring operation to be located at the location coordinates.

9. The non-transitory computer readable storage medium according to claim 7, wherein the method further comprises:
 detecting whether the touch action ends; and
 terminating an image acquiring operation if the touch action ends, and continuing to periodically acquire a corresponding image at the preset time interval if the touch action does not end.

10. The non-transitory computer readable storage medium according to claim 7, wherein the step of displaying timing prompt information comprises:
 playing an animation having a playing duration equal to the second duration.

11. The non-transitory computer readable storage medium according to claim 7, wherein the first preparation time is within a range from 0.1 s to 0.3 s, the second preparation time is within a range from 0.3 s to 1 s, and the time interval is within a range from 0.1 s to 0.3 s.

12. An image acquiring apparatus, comprising:
 one or more processors configured to execute:
 a receiving unit, configured to receive an operation instruction of a user in an area on an image acquiring interface screen, the operation instruction corresponding to a touch action of the user on the same area;
 a first determining unit, configured to determine, according to the operation instruction, whether a first duration of the touch action on the mage acquiring interface screen is equal to or greater than a preset first preparation time;
 a second determining unit, configured to: when the first duration is equal to or greater than the first preparation time, determine whether a second duration of the touch action on the mage acquiring interface screen is equal to or greater than a preset second preparation time;
 an image acquiring unit, configured to periodically acquire a corresponding image at a preset time interval when the second duration is equal to or greater than the second preparation time; and
 a display unit, configured to display a timed notification when the first duration is equal to or greater than the first preparation time;
 wherein the image acquiring unit is further configured to perform a corresponding, single image acquiring operation when the second duration is less than the second preparation time.

13. The image acquiring apparatus according to claim 12, the one or more processors are further configured to execute:
 an automatic focusing module, configured to acquire location coordinates corresponding to a touch point of the touch action, and set a focal point of an image acquiring operation to be located at the location coordinates.

14. The image acquiring apparatus according to claim 12, the one or more processors are further configured to execute:
 a detection unit, configured to detect whether the touch action ends; and
 the image acquiring unit is further configured to terminate an image acquiring operation when the touch action ends, and to continue to periodically acquire a corresponding image at the preset time interval when the touch action does not end.

15. The image acquiring apparatus according to claim 12, wherein the display unit is further configured to play an animation having a playing duration equal to the second duration.

16. The image acquiring apparatus according to claim 12, wherein the first preparation time is within a range from 0.1 s to 0.3 s, and the second preparation time is within a range from 0.3 s to 1 s.

17. The image acquiring apparatus according to claim 12, wherein the time interval is within a range from 0.1 s to 0.3 s.

* * * * *